(12) United States Patent
Jedari et al.

(10) Patent No.: US 12,743,913 B2
(45) Date of Patent: Sep. 22, 2026

(54) VEHICLE MOTOR POWERED MECHANISM DIAGNOSTIC SYSTEM AND METHOD USING A HALL EFFECT SENSOR

(71) Applicant: Ford Global Technologies, LLC, Dearborn, MI (US)

(72) Inventors: Esrafil Jedari, Northville, MI (US); Songlin Wu, Novi, MI (US); Bryan Michael Bolger, Canton, MI (US); Bradley G. Hochrein, Dexter, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 97 days.

(21) Appl. No.: 18/788,653

(22) Filed: Jul. 30, 2024

(65) Prior Publication Data

US 2026/0038311 A1 Feb. 5, 2026

(51) Int. Cl.
*G07C 5/08* (2006.01)
*B60N 2/02* (2006.01)

(52) U.S. Cl.
CPC ....... *G07C 5/0808* (2013.01); *B60N 2/02253* (2023.08)

(58) Field of Classification Search
CPC .......................... G07C 5/0808; B60N 2/02253
See application file for complete search history.

(56) References Cited

U.S. PATENT DOCUMENTS

| | | | | |
|---|---|---|---|---|
| 7,547,069 | B2 | 6/2009 | Diehl et al. | |
| 10,336,273 | B2 | 7/2019 | Lanter et al. | |
| 2011/0238256 | A1 | 9/2011 | Heeg et al. | |
| 2023/0135176 | A1* | 5/2023 | Yang | B60R 16/0231 701/36 |
| 2024/0181937 | A1* | 6/2024 | Yang | B60N 2/02246 |

FOREIGN PATENT DOCUMENTS

| | | | |
|---|---|---|---|
| EP | 4267427 | A1 | 11/2023 |
| WO | 2006000432 | A1 | 1/2006 |
| WO | 2022212427 | A1 | 6/2022 |

* cited by examiner

*Primary Examiner* — Abby Lin
*Assistant Examiner* — Renee LaRose
(74) *Attorney, Agent, or Firm* — Vichit Chea; Price Heneveld LLP

(57) ABSTRACT

A diagnostic system for diagnosing a motor powered mechanism on board a vehicle includes a current detector for detecting current drawn by a motor of the motor powered mechanism, a hall effect sensor operatively coupled to an output of the motor for generating a hall effect position signal, and a controller configured to receive the detected motor current and the hall effect position signal and to determine an obstruction or fault condition associated with the motor powered mechanism based on the detected motor current and hall effect sensor signal.

14 Claims, 4 Drawing Sheets

VEHICLE MOTOR POWERED MECHANISM DIAGNOSTIC SYSTEM AND METHOD USING A HALL EFFECT SENSOR

FIELD OF THE DISCLOSURE

The present disclosure generally relates to diagnostic techniques for diagnosing a motor powered mechanism on a vehicle, and more particularly relates to a vehicle motor diagnostic system and method that monitors and diagnoses the motor powered mechanism with a motor and a hall effect sensor.

BACKGROUND OF THE DISCLOSURE

Motor vehicles are commonly equipped with a plurality of motor powered mechanisms having electric motors, such as Direct Current (DC) motors, to perform various actuations on the vehicle. For example, vehicle seats are commonly powered with a motor powered system to actuate a seat or seat component to move into various positions and configurations. Motor powered mechanisms may be employed to translate the seat forward and backward, up and down, to tilt positions, and other actuations. It would be desirable to provide for a diagnostic system to diagnose the operation of a motor powered mechanism onboard a vehicle.

SUMMARY OF THE DISCLOSURE

According to a first aspect of the present disclosure, a diagnostic system for diagnosing a motor powered mechanism on board a vehicle includes a current detector for detecting current drawn by a motor of the motor powered mechanism, a hall effect sensor operatively coupled to an output of the motor for generating a hall effect position signal, and a controller configured to receive the detected motor current and the hall effect position signal and to determine an obstruction or fault condition associated with the motor powered mechanism based on the detected motor current and hall effect sensor signal.

Embodiments of the first aspect of the present disclosure can include any one or a combination of the following features:

- the motor comprises a DC electric motor;
- the controller detects an obstruction with an object based on the motor current exceeding a threshold and the hall effect signal indicating a position of movement between end of travel limits;
- the motor powered mechanism comprises an electric motor and a gear assembly;
- the controller detects a fault condition of the gear assembly;
- the motor powered mechanism is operatively coupled to a power seat;
- the motor powered mechanism actuates a seat component;
- the controller detects an obstruction based on the motor current and hall effect signal; and
- the controller detects a gear assembly fault based on the motor current and hall effect signal.

According to a second aspect of the present disclosure, a vehicle seat includes a seat base, a seat back and a motor powered mechanism having a motor and configured to actuate a movement of the seat. The motor powered mechanism has a current detector for detecting current drawn by the motor, a hall effect sensor operatively coupled to an output of the motor for generating a hall effect position signal, and a controller configured to receive the detected motor current and the hall effect position signal and to determine an obstruction or fault condition associated with the motor powered mechanism based on the detected motor current and hall effect sensor signal.

Embodiments of the second aspect of the present disclosure can include any one or a combination of the following features:

- the motor comprises a DC motor;
- the controller detects an obstruction with an object based on the motor current exceeding a threshold and the hall effect signal indicating a position of movement between end of travel limits;
- the motor powered mechanism comprises a motor and a gear assembly;
- the controller detects one of a fault condition of the gear assembly and a missing hard stop; and
- the motor powered mechanism is operatively coupled to a power seat.

The present disclosure also includes a method of detecting an obstruction or fault condition in a motor powered mechanism on a motor vehicle. The method includes detecting current drawn by a motor of the motor powered mechanism, sensing with a hall effect sensor a position of an output shaft of the motor and generating a hall effect position signal, and determining with a controller an obstruction or fault condition associated with the motor powered mechanism based on the detected motor current and hall effect sensor signal.

Embodiments of the third aspect of the present disclosure can include any one or a combination of the following features:

- the motor comprises a DC electric motor;
- the controller detects an obstruction with an object based on the motor current exceeding a threshold and the hall effect signal indicating a position of movement between end of travel limits;
- the motor drive assembly comprises an electric motor and a gear assembly; and
- the controller detects a fault condition of the gear assembly.

These and other features, advantages, and objects of the present disclosure will be further understood and appreciated by those skilled in the art by reference to the following specification, claims, and appended drawings.

DETAILED DESCRIPTION OF PREFERRED EMBODIMENTS

Figure 1:
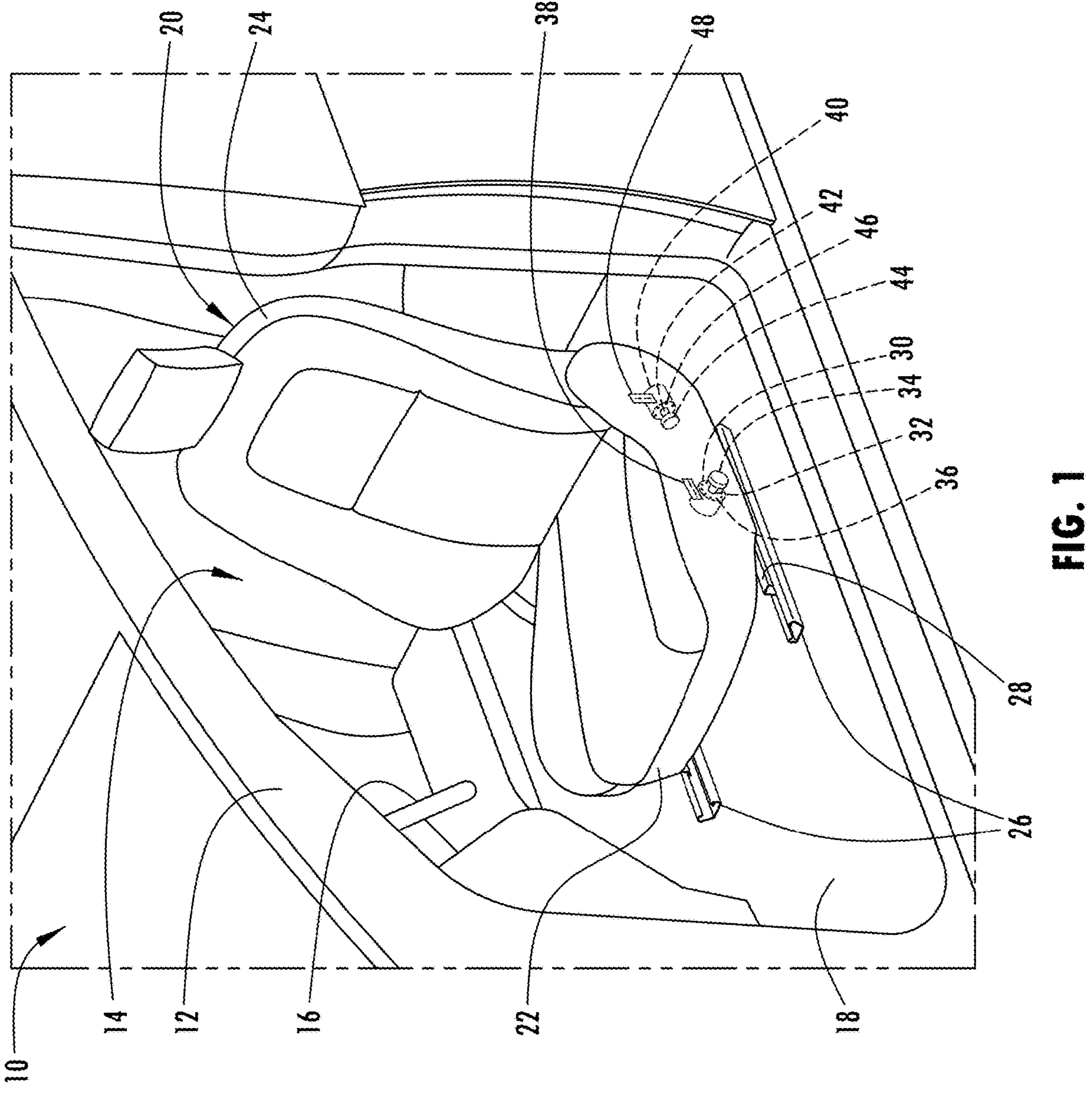
FIG. 1 is a front perspective view of a vehicle cabin interior having a seat equipped with electric motor powered mechanisms and a motor diagnostic system.

Reference will now be made in detail to the present preferred embodiments of the disclosure, examples of which are illustrated in the accompanying drawings. Wherever possible, the same reference numerals will be used throughout the drawings to refer to the same or like parts. In the drawings, the depicted structural elements are not to scale and certain components are enlarged relative to the other components for purposes of emphasis and understanding.

As required, detailed embodiments of the present disclosure are disclosed herein; however, it is to be understood that the disclosed embodiments are merely exemplary of the disclosure that may be embodied in various and alternative forms. The figures are not necessarily to a detailed design; some schematics may be exaggerated or minimized to show function overview. Therefore, specific structural and functional details disclosed herein are not to be interpreted as limiting, but merely as a representative basis for teaching one skilled in the art to variously employ the present disclosure.

For purposes of description herein, the terms "upper," "lower," "right," "left," "rear," "front," "vertical," "horizontal," and derivatives thereof shall relate to the concepts as oriented in FIG. 1. However, it is to be understood that the concepts may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

The present illustrated embodiments reside primarily in combinations of method steps and apparatus components related to a system and method of diagnosing a vehicle motor powered mechanism using a hall effect sensor. Accordingly, the apparatus components and method steps have been represented, where appropriate, by conventional symbols in the drawings, showing only those specific details that are pertinent to understanding the embodiments of the present disclosure so as not to obscure the disclosure with details that will be readily apparent to those of ordinary skill in the art having the benefit of the description herein. Further, like numerals in the description and drawings represent like elements.

As used herein, the term "and/or," when used in a list of two or more items, means that any one of the listed items can be employed by itself, or any combination of two or more of the listed items, can be employed. For example, if a composition is described as containing components A, B, and/or C, the composition can contain A alone; B alone; C alone; A and B in combination; A and C in combination; B and C in combination; or A, B, and C in combination.

In this document, relational terms, such as first and second, top and bottom, and the like, are used solely to distinguish one entity or action from another entity or action, without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element.

As used herein, the term "about" means that amounts, sizes, formulations, parameters, and other quantities and characteristics are not and need not be exact, but may be approximate and/or larger or smaller, as desired, reflecting tolerances, conversion factors, rounding off, measurement error and the like, and other factors known to those of skill in the art. When the term "about" is used in describing a value or an end-point of a range, the disclosure should be understood to include the specific value or end-point referred to. Whether or not a numerical value or end-point of a range in the specification recites "about," the numerical value or end-point of a range is intended to include two embodiments: one modified by "about," and one not modified by "about." It will be further understood that the end-points of each of the ranges are significant both in relation to the other end-point, and independently of the other end-point.

The terms "substantial," "substantially," and variations thereof as used herein are intended to note that a described feature is equal or approximately equal to a value or description. For example, a "substantially planar" surface is intended to denote a surface that is planar or approximately planar. Moreover, "substantially" is intended to denote that two values are equal or approximately equal. In some embodiments, "substantially" may denote values within about 10% of each other, such as within about 5% of each other, or within about 2% of each other.

As used herein the terms "the," "a," or "an," mean "at least one," and should not be limited to "only one" unless explicitly indicated to the contrary. Thus, for example, reference to "a component" includes embodiments having two or more such components unless the context clearly indicates otherwise.

Referring to FIG. 1, one example of an automotive or motor vehicle 10 is generally illustrated having a body 12 defining a cabin interior 14 which is also commonly referred to as a passenger compartment. The cabin interior 14 is configured to include one or more powered vehicle seats, such as front row seats found in a front row of seating as shown and further may include rear row seats found in one or more rear rows of seating. The vehicle seat assembly 20 may be a driver's seat which is generally located vehicle rearward of a steering wheel 16, and thus may serve to seat the driver of the motor vehicle 10 in the example shown. The seat assembly 20 includes a seat base 22 and a seat back 24 which may pivot relative to the seat base between incline and decline positions. The seat base 22 is mounted onto a frame support 28 which in turn is actuatable on a track 26. The track 26 is supported on top of a floor 18 of the cabin interior 14. The track 26 may enable the seat assembly 20 to move vehicle forward and rearward on the track 26. It should be appreciated that the motor vehicle 10 may include a plurality of powered seat assemblies, each powered seat assembly having a powered seat with a motor powered mechanism including one or more electric motors to actuate the seat or seat components as explained in the example shown herein.

The seat assembly 20 in the example shown in FIG. 1 is equipped with a plurality of electric motor powered mechanisms, thus forming a powered seat that may be actuated in one or more directions. Included is a first electric motor 30 which is configured to actuate and move the seat two ways longitudinally between forward and rearward positions on the track 26. The motor 30 may be actuated in response to a user input 38 which may include a toggle switch, for example, shown located on a side wall of the seat base 22. When a user actuates the toggle switch to the forward position, the first motor 30 drives the seat in the forward direction to a forward position. When a user actuates the use input 38 to command movement in the reverse direction, the first motor 30 drives the seat assembly 20 in the rearward direction to a rearward position. The first motor 30 may include a Direct Current (DC) motor that is part of a motor powered mechanism having an output shaft 32 which may engage a first gear assembly 34 with one or more first gears and/or linkages to drive the support member 28 on the track 26 and hence the seat amongst a plurality of positions. In addition, the first motor 30 has a first hall effect sensor 36 operatively coupled to the first motor 30, and more particularly coupled to the first motor shaft 32, to sense the position of the first motor shaft 32. As such, by monitoring an output signal of the hall effect sensor 36, the position and movement of the seat assembly 20 on the track 26 may be determined.

The seat assembly 20 is also configured to include a second electric motor powered assembly having a second electric motor 40 which, in one example, is configured to actuate the seat two ways, namely up and down, between an upward position and a lower position. The second motor 40 may be an electric DC motor that actuates the seat in response to a user input 48 which may include a toggle switch. When a user actuates the user input 48 with a command to raise the seat, the second electric motor 40 is actuated to power the seat upward. When a user actuates the user input 48 with a command to move downward, the seat assembly 22 is moved downward with the second electric motor 40. The second motor 40 is part of a motor powered mechanism that is configured to include a second motor shaft 42 which may interface with a second gear assembly 44 having one or more second gears and/or linkages to power drive the seat assembly 20 between upward and downward positions. In addition, a second hall effect sensor 46 is operatively coupled to the second motor shaft 42 to monitor a position of the second motor shaft 42 and thus a position of the movement of the seat assembly 20 between the upward and downward positions.

It should be appreciated that the seat assembly 20 may include other electric motor powered mechanisms with additional motors, each configured with a hall effect sensor. For example, a two-way tilt motor coupled to a gear assembly may incline and decline the seat back two ways and a bolster may be actuated with a bolster motor and associated gear assembly to move the bolsters. Thus, the seat assembly 20 may be a two-way, four-way, six-way, eight-way or a powered seat with a greater number of degree of movement each via a motor powered mechanism. It should further be appreciated that the motor vehicle 10 may include other seat assemblies having one or more motor powered mechanisms each equipped with a hall effect sensor.

The motor vehicle 10 may include other motor powered mechanisms configured to actuate other devices, each having motors onboard the vehicle which may likewise include a hall effect sensor. For example, the motor vehicle 10 may include one or more motors and gear assemblies operatively coupled to the steering wheel 16 to actuate the steering wheel 16 to one or more positions. According to other examples, the motor vehicle 10 may be equipped with motors and gear assemblies configured to actuate one or more sideview mirrors, foot pedals such as brake and accelerator pedals, and other motor powered mechanisms.

Each of the motor powered mechanisms, including the first motor powered mechanism and the second motor powered mechanism, is configured to be diagnosed with a diagnostic system to detect the performance of the motor and related mechanical actuation components such as gear assemblies and/or linkage assemblies. For example, the diagnostic system may monitor and detect an obstruction in the travel path of the seat assembly 20 and may perform one or more control functions. The diagnostic system may also detect one or more fault conditions of the corresponding motor and the associated drive assembly. For example, a fault condition such as a binding of the gear assembly may be detected. Other fault conditions may include a loose or disassembled gear assembly. Further fault conditions may include a misalignment or eccentricity of a rotor of the electric motor which may cause fluctuations in the sensor output signals. It should be appreciated that certain fault conditions of the motor powered mechanisms may result in loss of accuracy in the sensed seat position, potentially inconveniencing users.

Figure 2:
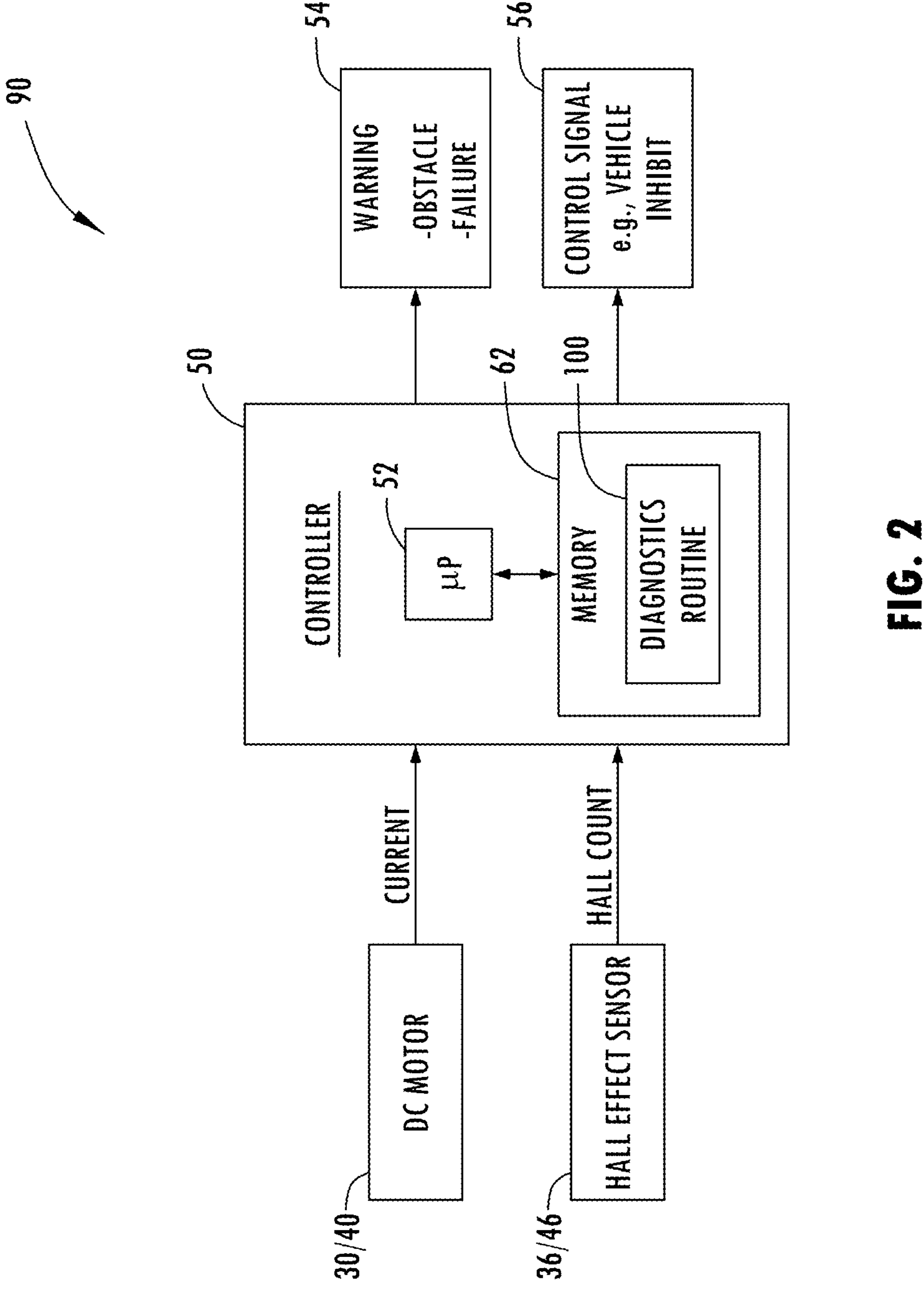
FIG. 2 is a block diagram illustrating the motor diagnostic system for diagnosing the operation of an electric motor powered mechanism, according to one example.

Referring to FIG. 2, the diagnostic system 90 is generally illustrated having a controller 50 configured to monitor the electric motor and the hall effect sensor and perform a diagnostic operation on the motor powered mechanisms. The controller 50 may include a microprocessor 52 and memory 62. Stored within memory 62 and executed by the microprocessor 52 is a diagnostic routine 100. It should be appreciated that the controller 50 may include a shared or dedicated controller and may include analog and/or digital circuitry. The controller 50 receives a sensed current from the DC motors 30 and 40. The controller 50 also receives the hall count position signal from each of the hall effect sensors 36 and 46. The controller 50 processes the sensed motor current and the sensed hall effect signal and detects one or more obstructions and fault conditions of the motor and associated drive mechanism. The controller 50 may issue a warning 54 of an obstruction or a fault condition of the motor powered mechanism. In addition, the controller 50 may issue a control signal 56 such as a signal to inhibit vehicle operation during a certain determined diagnosis or event.

Figure 3:
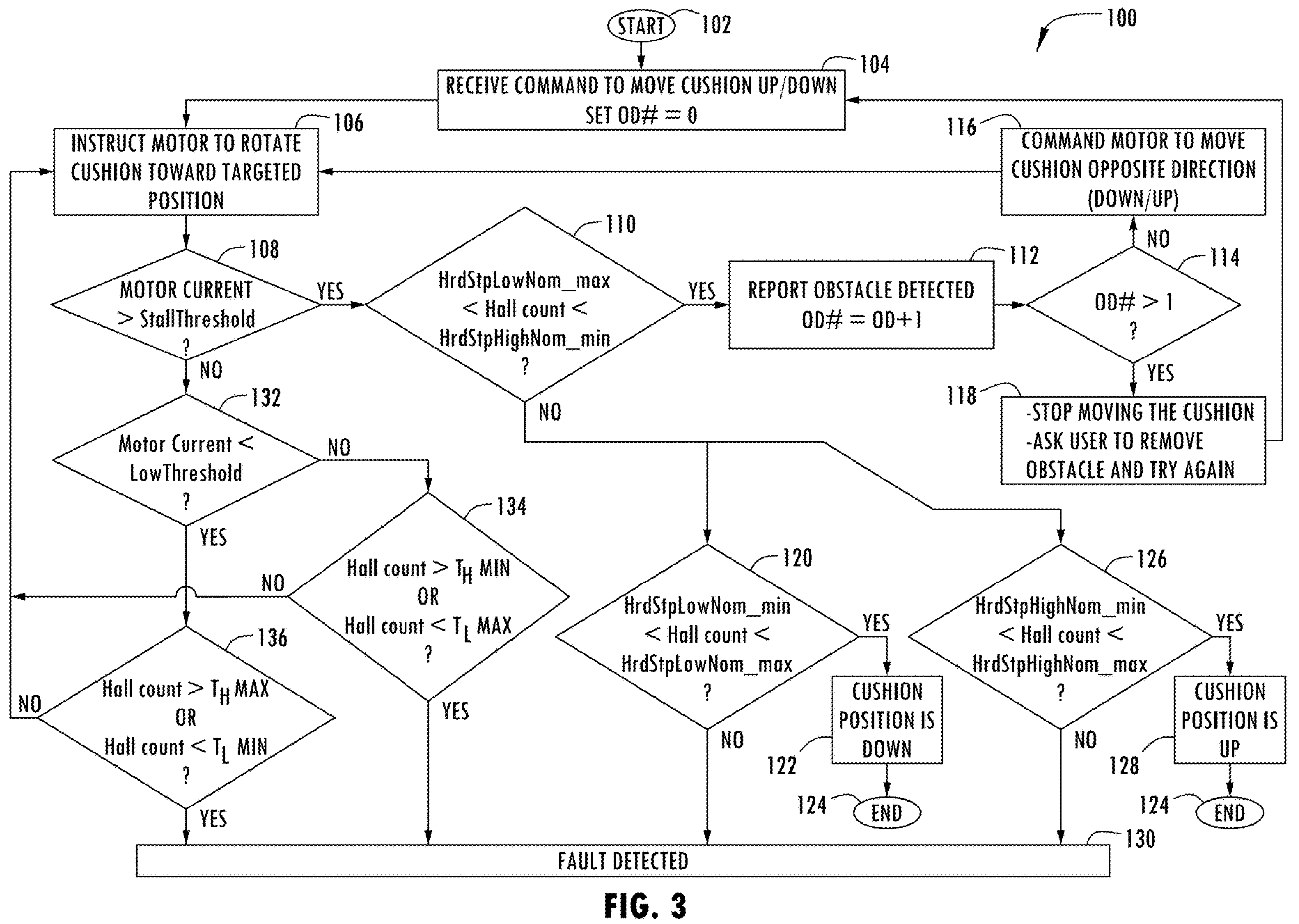
FIG. 3 is a flow diagram illustrating a routine for diagnosing the motor powered mechanism including detecting an obstruction or one or more fault detections.

Referring to FIG. 3, the diagnostic routine 100 is illustrated, according to one example. The diagnostic routine 100 begins at step 102 and proceeds to step 104 to receive a command input via one of the user input switches to move the seat base referred to as cushion up or down and sets an obstacle detection (OD) count number equal to zero (0). Next, routine 100 proceeds to step 106 to instruct the motor to rotate the seat cushion toward the targeted position. Thereafter, at decision step 108, routine 100 determines if the sensed motor current is greater than a motor stall threshold and, if so, proceeds to decision step 110 to determine if the sensed hall count is within a range between HrdStpLowNom_max and HrdStpHighNom_min and, if so, reports an obstacle detection at step 112, and sets the OD count number equal to OD+1, thus incrementing the count number. At decision step 114, routine 100 determines if the OD count number is greater than one (1) and, if not, proceeds to step 116 to command the motor to move the seat cushion in the opposite direction of up or down and returns to step 106 to instruct the motor to rotate the seat cushion toward the targeted system. If the OD count number is greater than one (1), indicative of a second actuation attempt, routine 100 proceeds to step 118 to command the motor to stop movement of the seat cushion and to prompt the user to remove the obstacle and to try the motorized actuation again.

If the hall effect sensor count number is outside of the range of HrdStpLowNom_max and HrdStpHighNom_min, then routine 100 proceeds to each of decision steps 120 and 126. At decision step 120, routine 100 determines if the hall effect sensor count number is within a range between the HrdStpLowNom_min and the HrdStpLowNom_max and, if so, confirms that the seat cushion position is down at step 122, before ending at step 124. If the hall effect sensor count number is outside of the HrdStpLowNom_min and HrdStpLowNom_max range, routine 100 proceeds to step 130 to determine that a fault is detected. This fault may include a malfunction of the seat cushion mechanism such as a disconnect in the system's motion transfer.

At decision step 126, routine 100 determines if the hall sensor count number is within a range of a HrdStpHighNom_min and HrdStpHighNom_max and, if so, confirms that the seat cushion position is up at step 128, before ending at step 124. If the hall count is not within the range of HrdStpHighNom_min and HrdStpHighNom_max, routine 100 proceeds to step 130 to determine a fault condition is detected. This fault may include a malfunction of the seat cushion mechanism such as a disconnect in the system's motion transfer.

At decision step 108, if routine 100 determines that the motor current is not greater than the motor stall threshold, routine 100 proceeds to decision step 132 to determine if the motor current is less than a low threshold. If the motor current is not less than the low threshold, routine 100 proceeds to decision step 134 to determine if the hall sensor count number is greater than a $T_H$ MIN or if the hall sensor count number is less than a $T_L$ MAX and, if so, proceeds to step 130 to determine that a fault condition has been detected. This fault may include a mechanical issue such as a missing hard stop.

If the motor current is determined to be less than the low threshold in decision step 132, routine 100 proceeds to decision step 136 to determine if the hall sensor count number is greater than a high $T_H$ MAX or if the hall sensor count number is less than a low $T_H$ MIN and, if so, proceeds to step 130 to determine that a fault detection has occurred. This fault may include a partial or complete disengagement of the gear assembly. If decision steps 134 or 138 are negative, routine 100 returns to step 106.

Figure 4:
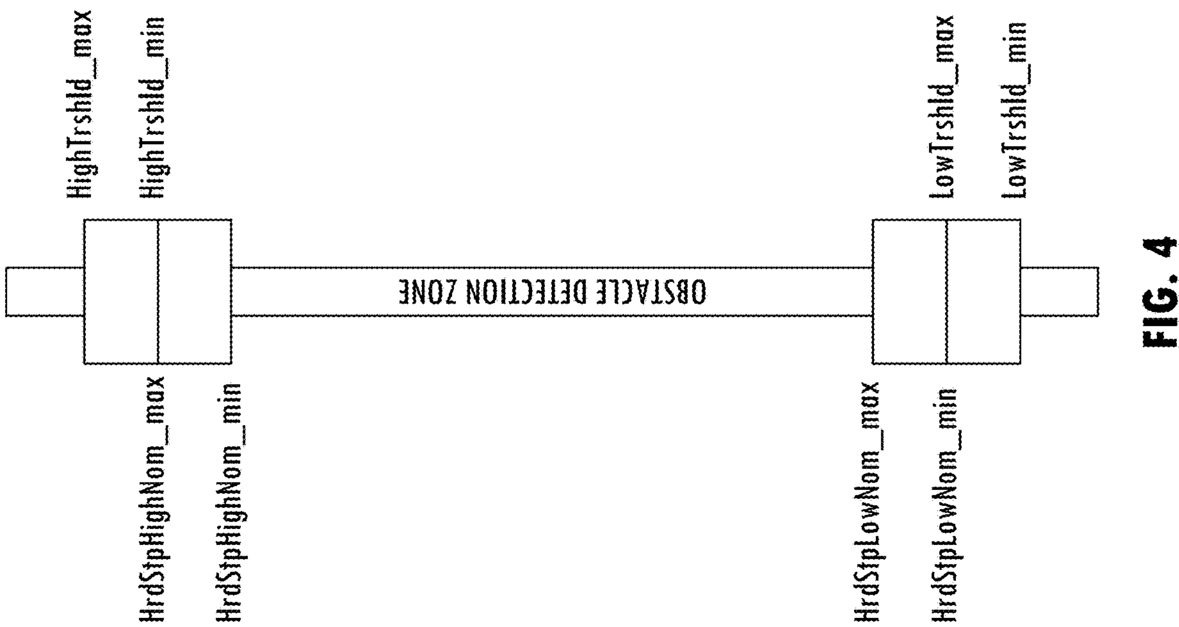
FIG. 4 is a schematic diagram illustrating detection zones of a hall effect sensor for sensing the movement of the motor powered mechanism.

The obstacle detection zone and the hard stop limits including $T_H$ MAX, $T_H$ MIN, $T_L$ MAX and $T_L$ MIN, are illustrated in FIG. 4. In addition, parameters HrdStpLowNom_min, HrdStpLowNom_max, HrdStpHighNom_min and HrdStpHighNom_max are also illustrated in FIG. 4. The $T_L$ MIN is the hall effect sensor count threshold beyond the hard stop lower bound at the down position. $T_L$ MAX is the hall effect sensor count threshold beyond the hard stop upper bound at the down position. $T_H$ MIN is the hall effect sensor count threshold beyond the hard stop lower bound at the up position. $T_H$ MAX is the hall effect sensor count threshold beyond the hard stop upper bound at the up position. HrdStpLowNom_min is the hard stop hall effect sensor count nominal threshold lower bound at the down position. HrdStpLowNom_max is the hard stop hall effect sensor count nominal threshold upper bound at the down position. HrdStpHighNom_min is the hard stop hall effect sensor count nominal threshold lower bound at the up position. HrdStpHighNom_max is the hard stop hall effect sensor count nominal threshold upper bound at the up position.

An obstacle creating an obstruction in the travel path can be detected within the obstacle detection zone between the nominal end of travel limits. Once the end of travel limits are reached, the motor current and hall effect sensor count signals are detected to determine the potential fault condition of the motor and associated drive assembly.

Accordingly, the diagnostic system 90 and method 100 advantageously provides for obstacle and fault detection of a motor powered mechanism on a vehicle 10. The diagnostic system 90 and method 100 are particularly advantageous for detecting an obstacle or motor fault associated with a motor powered mechanism on a vehicle seating assembly on the vehicle 10. By employing the diagnostic system 90 and method 100, mechanical failures associated with the motor and drive assembly can effectively be detected, thereby enhancing the overall reliability and precision of the seat positioning system, for example.

It is to be understood that variations and modifications can be made on the aforementioned structure without departing from the concepts of the present disclosure, and further it is to be understood that such concepts are intended to be covered by the following claims unless these claims by their language expressly state otherwise.

What is claimed is:

1. A diagnostic system for diagnosing a motor powered mechanism having an electric motor and a gear assembly on board a vehicle, the diagnostic system comprising: a current detector for detecting current drawn by a motor of the motor powered mechanism; a hall effect sensor operatively coupled to an output of the motor for generating a hall effect position signal; and a controller configured to receive the detected motor current and the hall effect position signal and to determine an obstruction or fault condition associated with the motor powered mechanism based on the detected motor current and hall effect sensor signal, wherein the controller detects a fault condition of the gear assembly including a missing hard stop.

2. The diagnostic system of claim 1, wherein the motor comprises a DC electric motor.

3. The diagnostic system of claim 1, wherein the controller detects an obstruction with an object based on the motor current exceeding a threshold and the hall effect signal indicating a position of movement between end of travel limits.

4. The diagnostic system of claim 1, wherein the motor powered mechanism is operatively coupled to a power seat.

5. The diagnostic system of claim 4, wherein the motor powered mechanism actuates a seat component.

6. The diagnostic system of claim 1, wherein the controller detects an obstruction based on the motor current and hall effect signal.

7. The diagnostic system of claim 1, wherein the controller detects a gear assembly fault based on the motor current and hall effect signal.

8. A vehicle seat comprising: a seat base; a seat back; and a motor powered mechanism having a motor and configured to actuate a movement of the seat, wherein the motor powered mechanism comprises a motor and a gear assembly; a current detector for detecting current drawn by the motor; a hall effect sensor operatively coupled to an output of the motor for generating a hall effect position signal; and a controller configured to receive the detected motor current and the hall effect position signal and to determine an obstruction or fault condition associated with the motor powered mechanism based on the detected motor current and hall effect sensor signal, wherein the controller detects a fault condition of the gear assembly including a missing hard stop.

9. The vehicle seat of claim 8, wherein the motor comprises a DC motor.

10. The vehicle seat of claim 8, wherein the controller detects an obstruction with an object based on the motor current exceeding a threshold and the hall effect signal indicating a position of movement between end of travel limits.

11. The vehicle seat of claim 8, wherein the motor powered mechanism is operatively coupled to a power seat.

12. A method of detecting an obstruction or fault condition in a motor powered mechanism having an electric motor and a gear assembly on a motor vehicle, the method comprising: detecting current drawn by a motor of the motor powered mechanism; sensing with a hall effect sensor a position of an output shaft of the motor and generating a hall effect position signal; and determining with a controller an obstruction or fault condition associated with the motor powered mechanism based on the detected motor current and hall effect sensor signal, wherein the controller detects a fault condition of the gear assembly including a missing hard stop.

13. The method of claim 12, wherein the motor comprises a DC electric motor.

14. The method of claim 12, wherein the controller detects an obstruction with an object based on the motor current exceeding a threshold and the hall effect signal indicating a position of movement between end of travel limits.

* * * * *